(12) United States Patent
Clark

(10) Patent No.: US 7,470,167 B2
(45) Date of Patent: Dec. 30, 2008

(54) COMBINATION MONITORING AND ENTERTAINMENT SYSTEM FOR CHILDREN

(76) Inventor: Cynthia C. Clark, 913 Talma St., Aurora, IL (US) 60505

( * ) Notice: Subject to any disclaimer, the term of this patent is extended or adjusted under 35 U.S.C. 154(b) by 400 days.

(21) Appl. No.: 11/222,489

(22) Filed: Sep. 9, 2005

(65) Prior Publication Data
US 2007/0058039 A1 Mar. 15, 2007

(51) Int. Cl.
*A63H 33/00* (2006.01)
*H04N 7/18* (2006.01)
*A01M 1/02* (2006.01)

(52) U.S. Cl. .................. 446/227; 446/485; 446/397; 446/175; 340/573.1; 348/143

(58) Field of Classification Search ............ 446/227, 446/485, 397, 175
See application file for complete search history.

(56) References Cited

U.S. PATENT DOCUMENTS

| | | | |
|---|---|---|---|
| 4,363,181 A | 12/1982 | Hyman et al. | |
| 4,640,034 A | 2/1987 | Zisholtz | |
| 4,673,057 A * | 6/1987 | Glassco | 181/144 |
| 4,973,286 A | 11/1990 | Davison | |
| 4,984,380 A | 1/1991 | Anderson | |
| 5,073,825 A | 12/1991 | Holdredge et al. | |
| 5,210,532 A | 5/1993 | Knoedler et al. | |
| 5,255,038 A | 10/1993 | Suzuka | |
| 5,387,146 A | 2/1995 | Smith et al. | |
| 5,726,706 A * | 3/1998 | Walsh | 348/373 |
| 5,774,861 A | 6/1998 | Spector | |
| 5,951,360 A | 9/1999 | Fearon et al. | |
| 5,989,200 A * | 11/1999 | Yoshimura et al. | 600/587 |
| 6,043,747 A | 3/2000 | Altenhofen | |
| 6,064,430 A * | 5/2000 | Lefkowitz | 348/151 |
| 6,084,527 A | 7/2000 | Spector | |
| 6,091,329 A | 7/2000 | Newman | |
| 6,104,292 A | 8/2000 | Rombom et al. | |
| 6,113,455 A | 9/2000 | Whelan et al. | |
| 6,116,983 A | 9/2000 | Long et al. | |
| 6,759,961 B2 | 7/2004 | Fitzgerald et al. | |
| 2003/0153240 A1 * | 8/2003 | DeJule | 446/227 |

* cited by examiner

*Primary Examiner*—Gene Kim
*Assistant Examiner*—Urszula M Cegielnik
(74) *Attorney, Agent, or Firm*—Meroni & Meroni, P.C.; Charles F. Meroni, Jr.; Christopher J. Scott

(57) ABSTRACT

A dual functioning system for enabling a user to selectively monitor and entertain a subject comprises an entertainment system and a surveillance system. The entertainment system comprises a visual display, signal-delivering circuitry, signal-inputting hardware, and an extendable arm assembly. The arm assembly selectively positions the visual display for viewing by a target subject. The signal-inputting hardware enables the user to output stimuli upon the visual display via the signal-delivering circuitry. The visual display comprises at least one energy-passing aperture. The surveillance system comprises a camera assembly, data-transmitting circuitry, and monitoring hardware. The camera assembly is positioned adjacent a select energy-passing aperture for receiving and transmitting monitorial data input to the monitoring hardware via the select energy-passing aperture and the data-transmitting circuitry and, having a selectively colored lens light filter, also provides a color-camouflaged display to the subject.

9 Claims, 11 Drawing Sheets

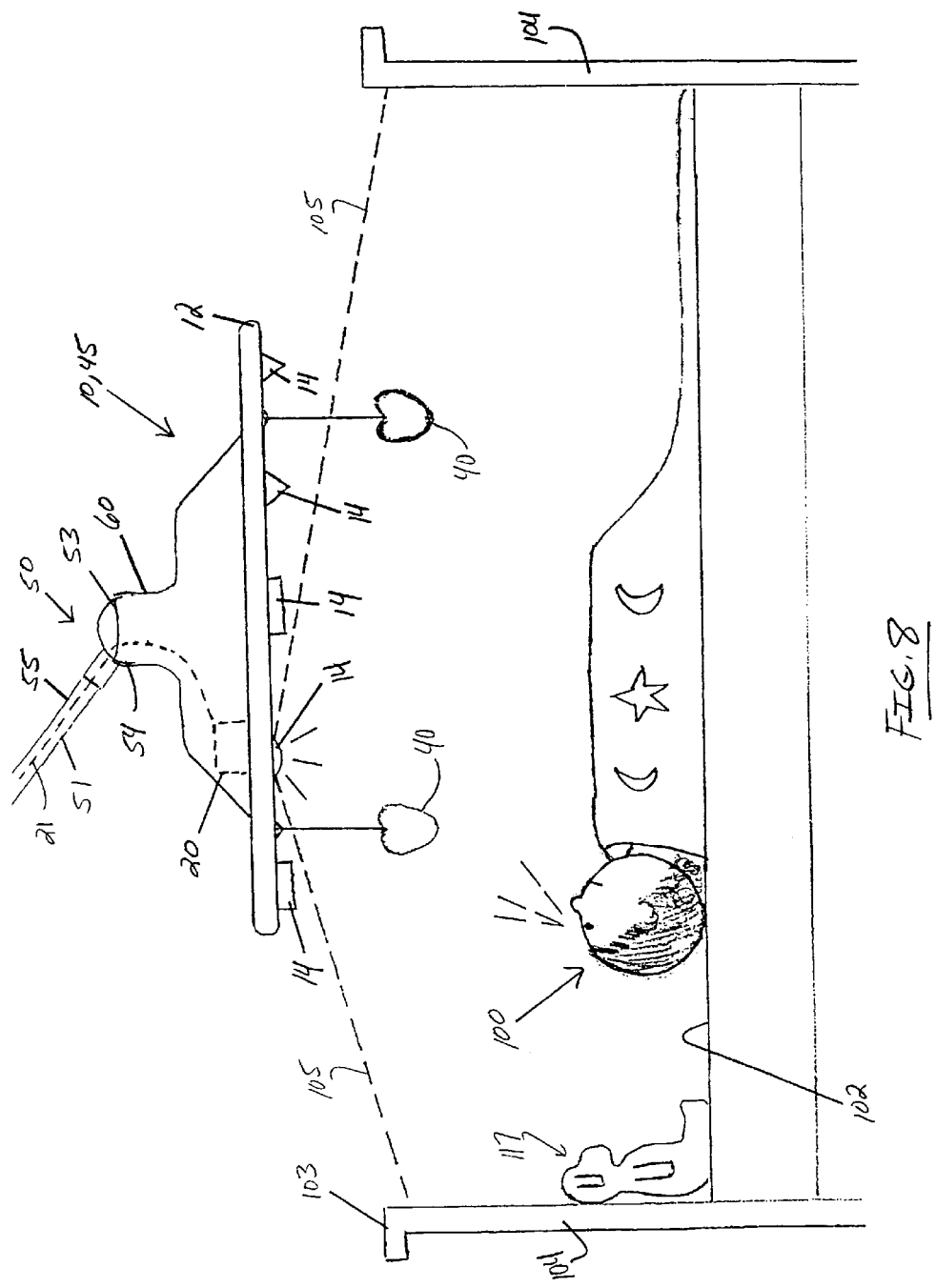

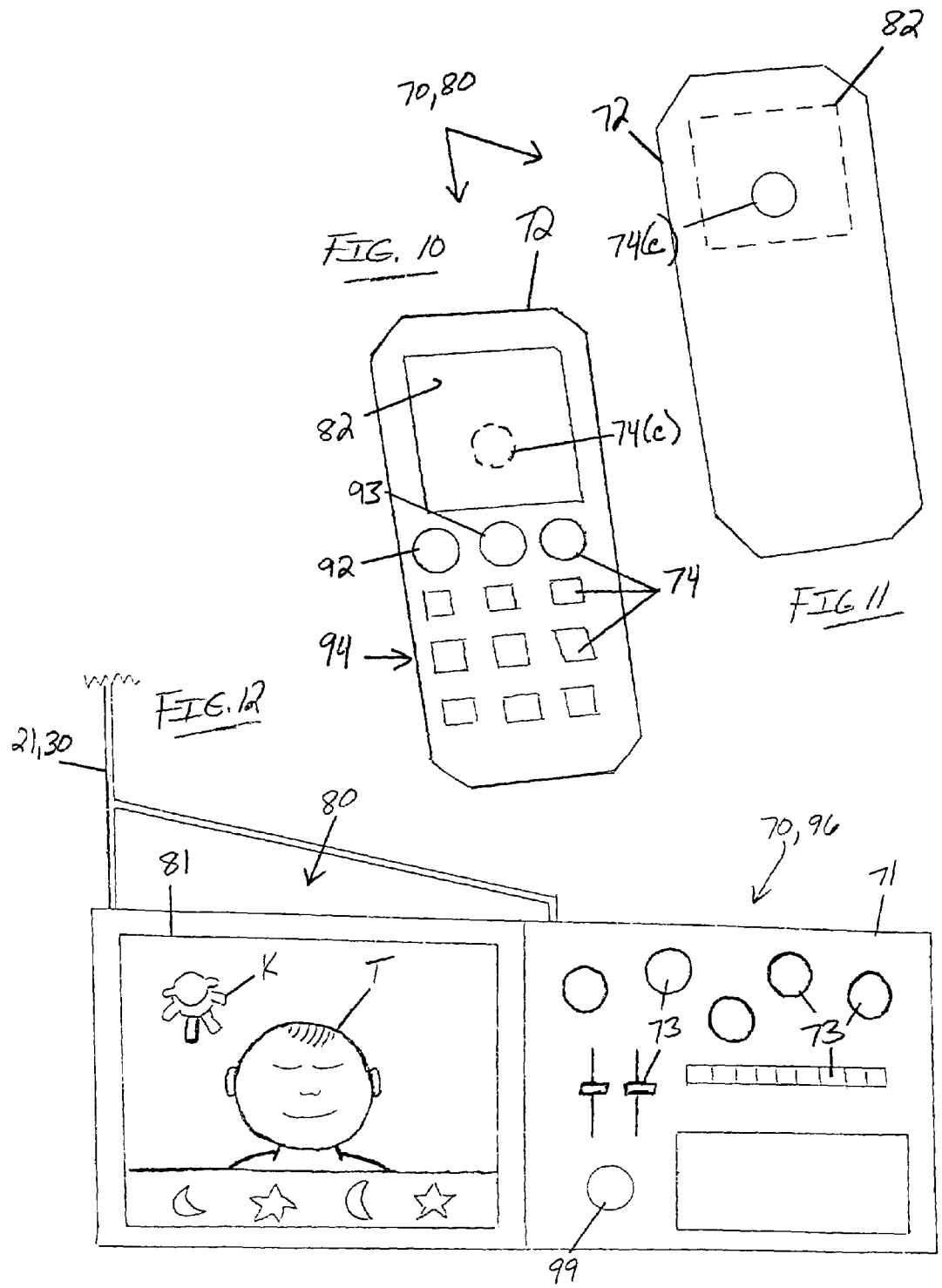

COMBINATION MONITORING AND ENTERTAINMENT SYSTEM FOR CHILDREN

BACKGROUND OF THE INVENTION

1. Field of the Invention

The present invention generally relates to infant entertainment mobile or similar other infant entertainment apparatus. More particularly, the present invention relates to a subject or infant-entertaining apparatus or system cooperatively associated with a subject or infant-monitoring system. The dual monitoring-entertainment system incorporates the use of certain surveillance components having attractive or captivating coloration features so as to be color-camouflaged to the target subject or infant.

2. Description of the Prior Art

The prior art specifically directed to infant entertainment apparatus and the like is well-developed. Multifunctional infant-entertaining mobile apparatuses, as a sub-category of broad based infant entertainment toys and such, are further fairly well-developed. A brief listing of certain prior art specifically relating to infant-entertaining mobile apparatus and/or system(s) and the like, is briefly described, hereinafter.

U.S. Pat. No. 4,640,034 ('034 patent), which issued to Zisholtz, discloses a Mobile for Infants. The '034 patent teaches a sound reproducing mobile for connection to cribs or other structures holding an infant. The mobile includes a housing in which is reasonably secured an audio cassette player. The housing includes clamp means for releasably securing the mobile to the structure holding the infant. The cassette player, when operated, reproduces comforting voices via a loudspeaker and at the same time provides electrical power to a motor for causing the movement of overhanging decorative mobile elements. A voice actuated switch is provided to operate the player and mobile in automatic response to the detection of ambient sound. The player can also be operated manually. The cassette player is releasably secured to the mobile so that it can be removed for independent use thereof.

U.S. Pat. No. 4,984,380 ('380 patent), which issued to Anderson, discloses a Body-Motion Activated Crib Mobile. The '380 patent teaches a crib mobile responsive to body motion of an infant. The mobile system is based on use of a passive infrared sensor associated electrical switching of the type employed for security systems that turn on floodlights in response to detection of the presence of an intruder. An A.C. motor, drive shaft, and support rod for the mobile are mounted on an arm that extends from a housing connectable to a ceiling, and the sensor is mounted on another arm. Electrical connection may be made to a conventional A.C. ceiling outlet. The sensor provides a signal to activate the motor when it detects motion above a predetermined level, and it includes a time delay feature that prevents turning the motor off for a period after such motion is no longer detected. Sensitivity of the sensor and the duration of the time delay are adjustable. The mobile structure includes horizontally extending arms for supporting toys or decorative objects for being rotated in a circular path above a crib. The system provides an educational effect in that an infant learns to control operation of the device by increasing or decreasing its body motion. The system may also include a remotely located sound producing device and a transmitter for remotely turning on the device.

U.S. Pat. No. 5,073,825 ('825 patent), which is issued to Holdredge, discloses a Convertible Visual Display Device. The '825 patent teaches a convertible audio-visual display center adapted to reproduce visual images on a video display unit such as a television and audio production of sound or music for the entertainment and/or education of infants in their cribs. The same device is readily available to usage as a work station for a computer console with simple adjustments.

U.S. Pat. No. 5,951,360 ('360 patent), which is issued to Fearon et al. discloses an Infant Mobile with Compact Disc Cassette Player Apparatus. The '360 patent teaches a combination system including an infant mobile and compact disc/cassette player apparatus. The invention comprises a combination compact disc player and a cassette player for playing music that is effective in soothing or stimulating an infant. The apparatus is attached to the side of an infant's crib or playpen in a conventional manner. The mobile fixtures turn in a synchronized response to the music characteristics. The parent or caregiver is provided the option of playing music continuously, allowing the device to self actuate in response to motion on the part of the infant, or allowing the mobile to turn in response to sounds made by the infant. The control of the compact disc and cassette player is also available via an infrared remote control. The mobile structure is detachable to allow for the use of the music reproduction system by itself as the child grows older.

U.S. Pat. No. 6,084,527 ('527 patent), which issued to Spector discloses a Combined Monitor and Light Box Assembly. The '527 patent teaches a combined monitor and light box assembly installable in a crib enclosure occupied by an infant. The assembly which is interactive with the infant includes a light box on whose front face is mounted a semi-reflective mirror behind which is a film transparency having a photographic image of the infant's mother. When a light bulb in the box is energized to illuminate the transparency, the image of the mother becomes visible to the infant through the mirror which is then effectively transparent. Associated with the light box is a sound-activated switching device connected between the bulb and a power source. The switching device, when activated by crying sounds emanating from the infant, remains activated for a predetermined period to energize the bulb and illuminate the transparency. Also associated with the light box is a record playback unit having stored therein a voice message recorded by the mother addressed to her infant, the unit being rendered operative only when the bulb is energized. Hence when the infant cries, it is then presented with an image of its mother and hears her comforting message, as a consequence of which the infant is induced to stop crying. The monitor which is operative only after the switch is activated, radio-transmits the crying sounds then emanating from the infant to a receiver that can be heard by the mother.

United States Patent Application Publication No. US 2003/0153240 ('240 Publication), authored by DeJule, discloses a Hanging Mobile Device with Electronic Display. The '240 Publication teaches a mobile having an electronic display. The display is preferably a thin, flexible display such as an organic light emitting diode display. The display is coupled to a computing device. The mobile optionally includes sound output, image output, or video output. A camera or sensing device optionally serves as the input for a baby monitoring system. In one preferred embodiment, the mobile is interactive, and can respond to various sensed aspects, such as sound, light, or gestures via gesture recognition.

It will be seen from a further review of the above-referenced patents and other prior art generally known to exist relating to infant-entertaining toys, apparatuses, and systems, that the prior art does not teach a dual system for monitoring and entertaining an infant whereby certain components of the surveillance/monitoring system are provided with select coloration so as to simultaneously color-camouflage the surveillance system and visually stimulate and/or entertain the target subject, such as an infant. Thus, the prior art perceives a need for a dual system for monitoring and entertaining an infant whereby certain components of the surveillance/monitoring system are provided with select coloration so as to simultaneously color-camouflage the surveillance system and visually stimulate and/or entertain the target subject.

SUMMARY OF THE INVENTION

Accordingly, it is an object of the present invention to provide a monitor-entertainment system for enabling at least one user to selectively and remotely monitor and entertain a target subject, the monitor-entertainment system comprising, in combination, an entertainment system and a surveillance system. The entertainment system comprises certain signal-outputting means such as a screen assembly as well as certain signal-delivering circuitry, certain signal-inputting means, and certain output-positioning means, such as an extendable arm assembly. The output-positioning means are designed to enable a user to selectively position the signal-outputting means intermediate the signal-inputting means and a target subject. The signal-delivering circuitry electrically communicates the signal-outputting means with the signal-inputting means. The signal inputting means, such as certain input devices and instructions associated with a computer, enable at least one user to selectively output entertaining stimuli upon the signal-outputting means via the signal-delivering circuitry. The signal-outputting means (such as a video screen) are designed for outputting the stimuli to the subject. Notably, the signal-outputting means comprise at least one energy-passing aperture.

The surveillance system comprises certain data-inputting means (such as a surveillance camera assembly), certain data-transmitting circuitry, and certain data-outputting means (such as computer or video monitor). The data-transmitting circuitry electrically communicates the data-inputting means with the data-outputting means. Notably, the data-inputting means are positioned adjacent a select energy-passing aperture for receiving and transmitting monitorial data input to the data-outputting means via the select energy-passing aperture and the data-transmitting circuitry. Typically, the user or caretaker wishes to entertain and/or monitor the target subject from a distance. Given that the circuitry may enable remote communications, it is thus contemplated that the monitor-entertainment system of the present invention may enable at least one user to selectively monitor and entertain the target subject.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of my patent drawings, as follows:

FIG. 8 is a fragmentary side depiction of an extended screen assembly as positioned in superior adjacency to a target subject spatially-bound by head structure, foot-structure, and subject-support structure.

FIG. 10 is a first plan view of a generic cellular telephone showing generic data/instruction input means and generic data output means.

FIG. 11 is a second plan view of a generic cellular telephone showing generic data input means.

FIG. 12 is a fragmentary plan depiction of monitorial data output structure and entertainment signal input structure in electrical communication with signal-transmitting circuitry.

DETAILED DESCRIPTION OF THE PREFERRED EMBODIMENT(S)

Figure 1:
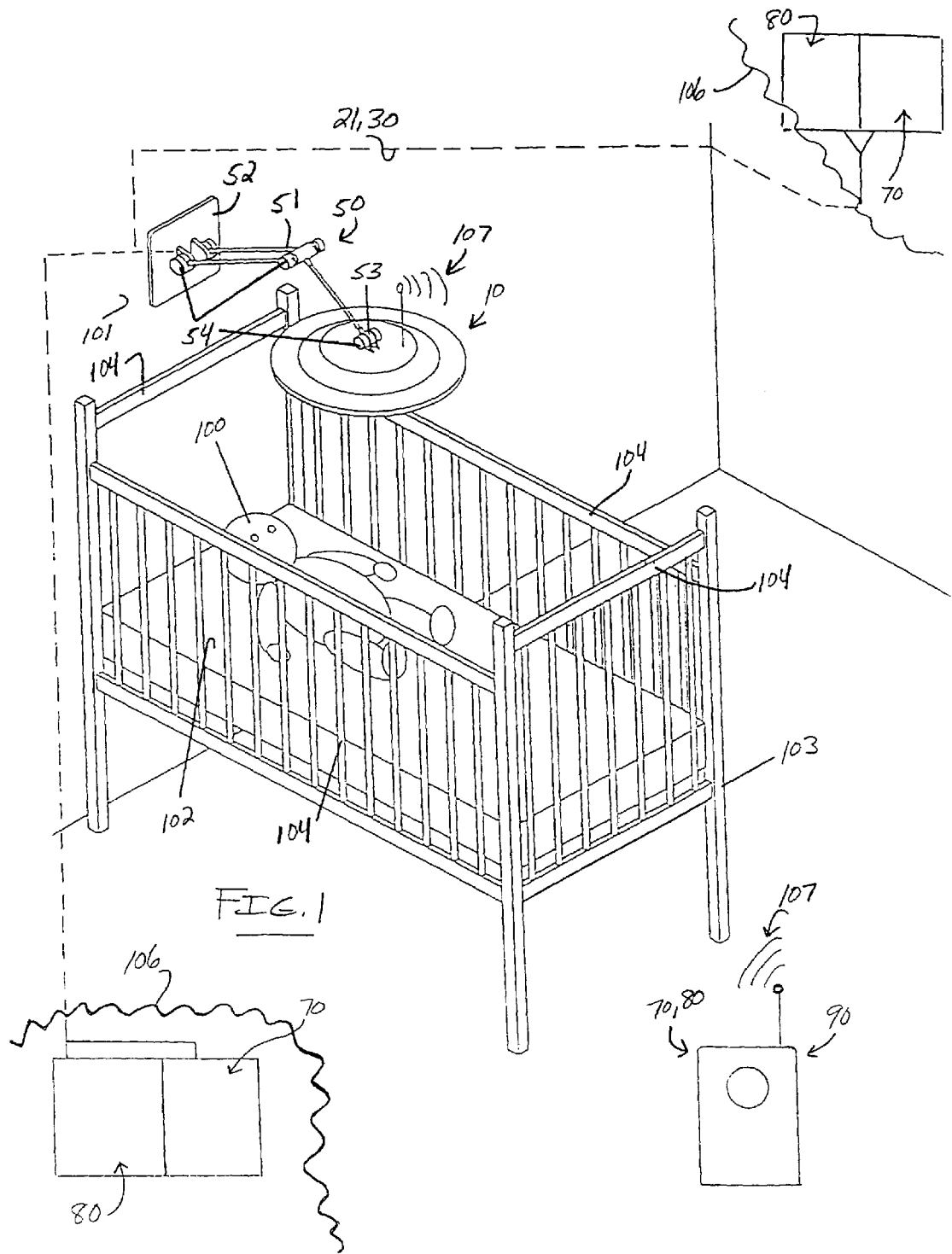
FIG. 1 is a fragmentary perspective view of the preferred monitor-entertainment system of the present invention depicting certain means for communicating with an infant-entertaining mobile apparatus as cooperatively associated with an infant support assembly.

Referring now to the drawings, the preferred embodiment of the present invention concerns a system having dual functionality, and generally designed for use with infants or small children. The dual system functions to simultaneously monitor and entertain an infant or child as spatially bound by a crib, play pen, bed or similar other infant or child-protecting or supporting means. The present invention may thus be said to disclose a monitor-entertainment system for enabling at least one user or caretaker to selectively monitor and entertain a spatially-bound target subject 100 as generally illustrated and referenced in FIGS. 1, 7, and 8. It has been noted that those in need of supervision or other subjects placed under authority or control or who enjoy the protection(s) of a caretaker and the like, are often more easily supervised if entertained (the entertainment source further spatially-bounding the subject via the captivating effects of entertainment). In this regard, the essence of the current invention is a means to entertain a target subject and simultaneously monitor or supervise the target subject via certain means for surveillance cooperatively associated with the means to entertain the target subject 100.

The infant monitor-entertainment system of the present invention thus preferably comprises, in combination an entertainment system and a surveillance system. The entertainment system preferably comprises entertainment signal-outputting means as preferably defined by a screen assembly 10 as illustrated and referenced in FIGS. 1-9, inclusive. Further, the entertainment system comprises certain entertainment signal-delivering circuitry as generally referenced at 30 in FIGS. 1-4, 6, and 12; certain entertainment signal-inputting means as generally depicted in FIGS. 10-12; and certain output-positioning means 50 as generally referenced in FIGS. 1-6, 8 and 9. From an inspection of the noted figures, it will be seen that the (entertainment) signal-delivering circuitry 30 functions to electrically communicate the screen assembly 10 with the (entertainment) signal-inputting means 70 as generally referenced in FIGS. 1, and 10-12. Necessarily, the signal-delivering circuitry 30 is in electrical communication with a power source, whether by electrochemical battery or alternating current outlet. It is believed that electrical power may be provided to the system via signal-delivering circuitry and/or certain data-delivering circuitry as further described hereinafter.

It is contemplated that the signal-inputting means may be defined by a computer or central-processing means 71 (with data/instruction-inputting means 73) as generically depicted in FIG. 12; or a cellular telephone 72 (with data/instruction-inputting means 74) as generically depicted in FIGS. 10 and 11. As commonly practiced in the art, it will be readily understood that the signal-inputting means enable at least one user to selectively output entertaining stimuli (as instructively input into the signal-inputting means) upon the screen assembly 10 via the signal-delivering circuitry 30.

From a further inspection of the figures, it will be seen that the output-positioning means 50 may preferably be defined by an extendable arm assembly 51, which arm assembly 51 preferably comprises an anchor end 52 as further illustrated and referenced in FIGS. 1-6; a display end 53 as illustrated and referenced in FIGS. 1-5, 8, and 9; and at least one joint 54 intermediate anchor end 52 and display end 53. It will be seen from an inspection of FIGS. 1-5 that in the preferred embodiment it is contemplated that a plurality of joints 54 may cooperate to extend and/or position screen assembly 10 relative to the target subject 100 and/or a select support structure 101, which select support structure is designed to receive and fixedly support anchor end 52 as attached thereto via certain anchoring means.

Figure 4:
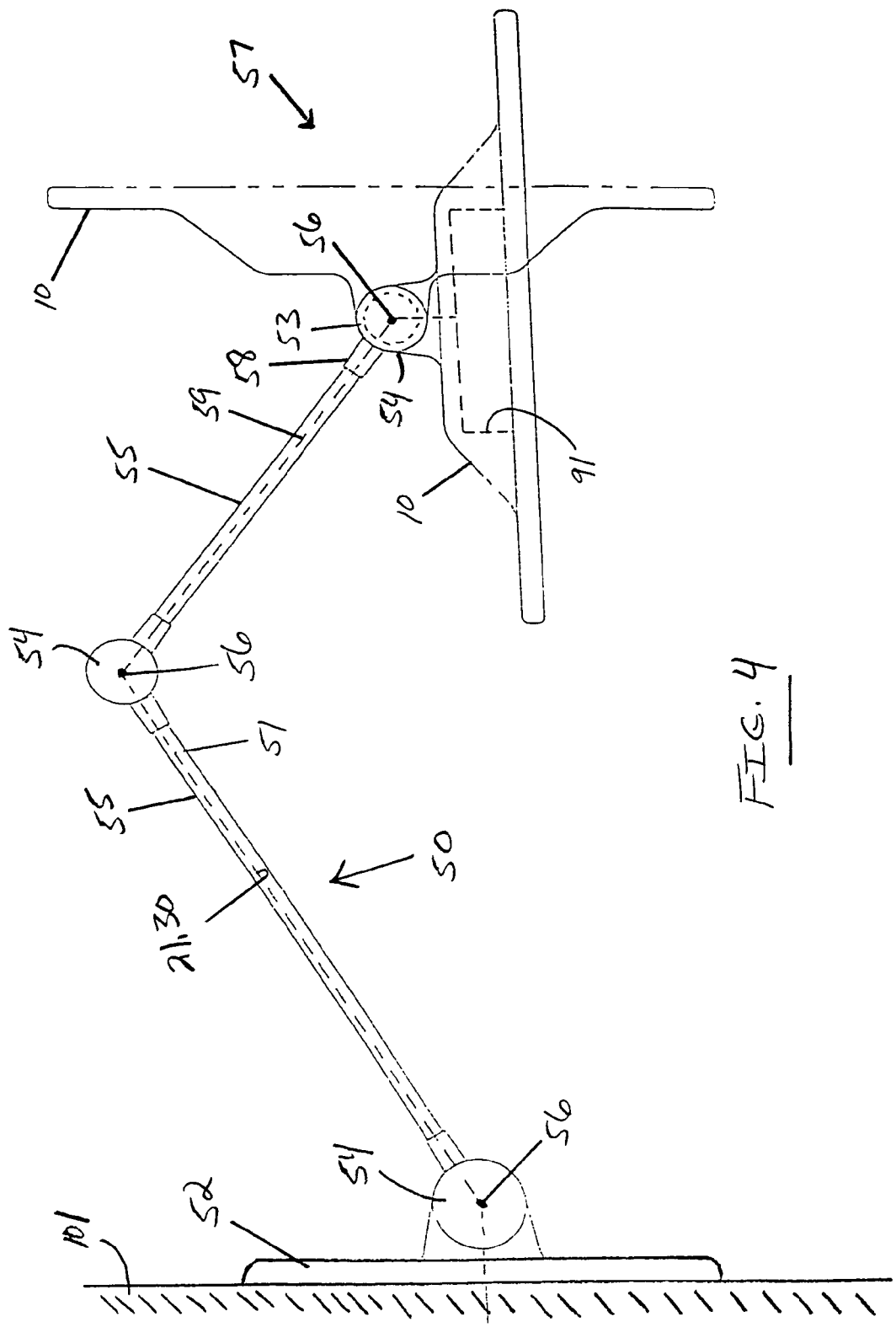
FIG. 4 is a fragmentary side plan depiction of the screen assembly as attached to a select support structure via the extendable arm assembly in an extended state showing the screen assembly as positioned in solid lines, the screen assembly as repositioned in broken lines, and certain hidden structures as located within the arm assembly and the screen assembly.
Figure 5:
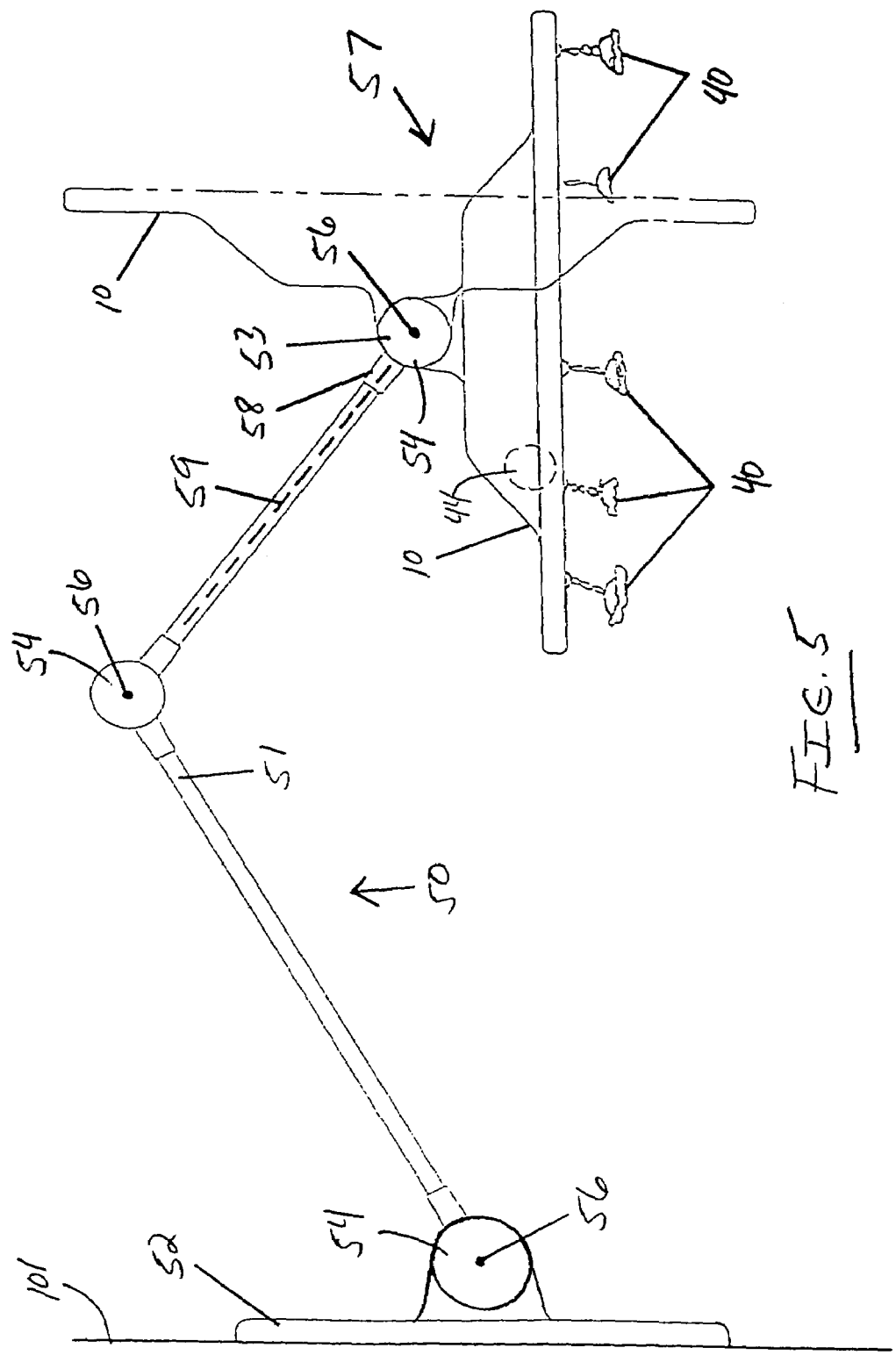
FIG. 5 is a fragmentary side plan depiction of the screen assembly as attached to a select support structure via the extendable arm assembly in an extended state showing the screen assembly as positioned in solid lines, the screen assembly as repositioned in broken lines, and certain hanging elements as selectively attached to the screen assembly as positioned.
Figure 6:
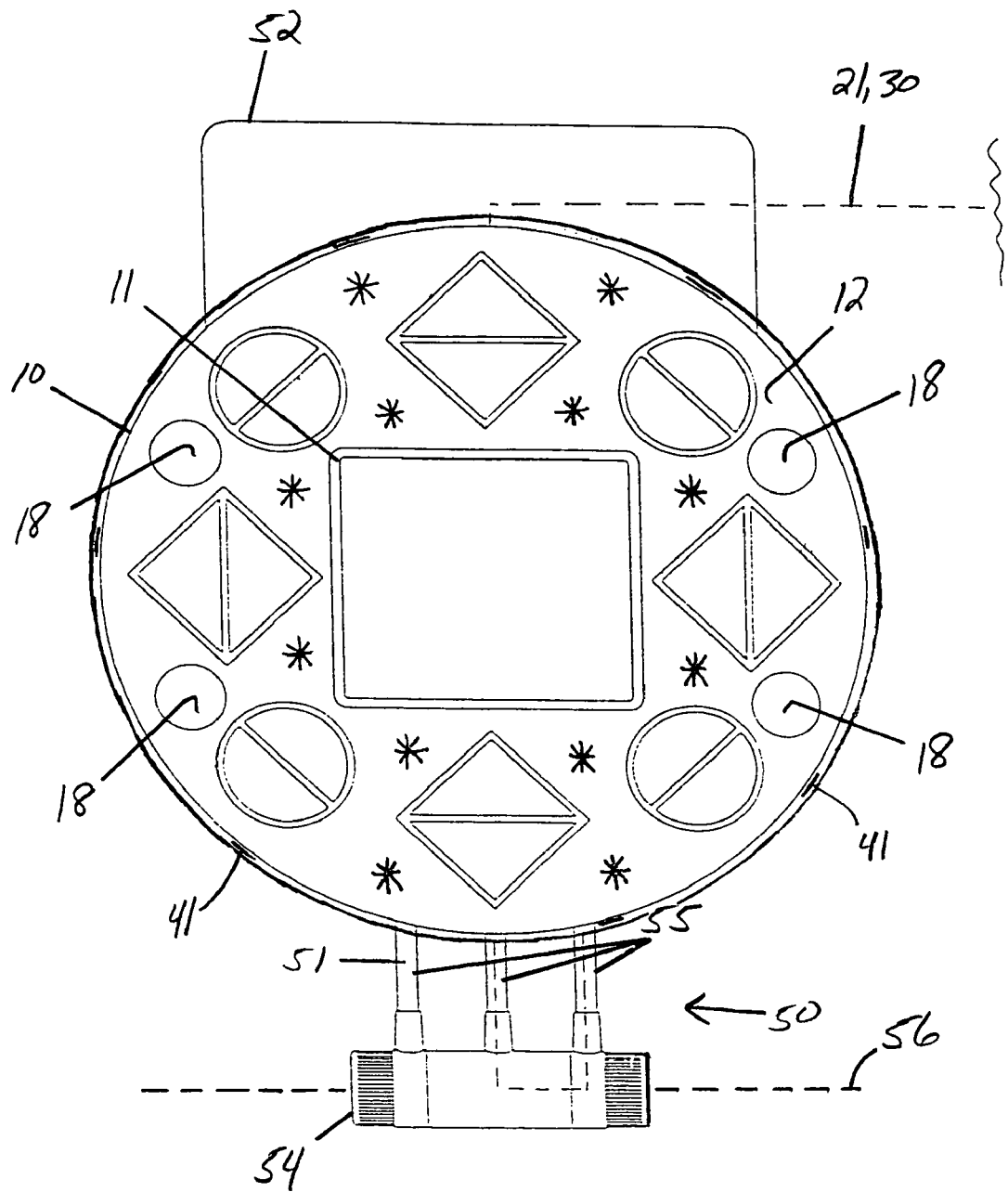
FIG. 6 is a plan view of a viewable surface of the screen assembly showing a view screen and selectively sized and shaped peripheral visual displays with an anchor end and certain extension structure connecting the screen assembly to the anchor structure.
Figure 9:
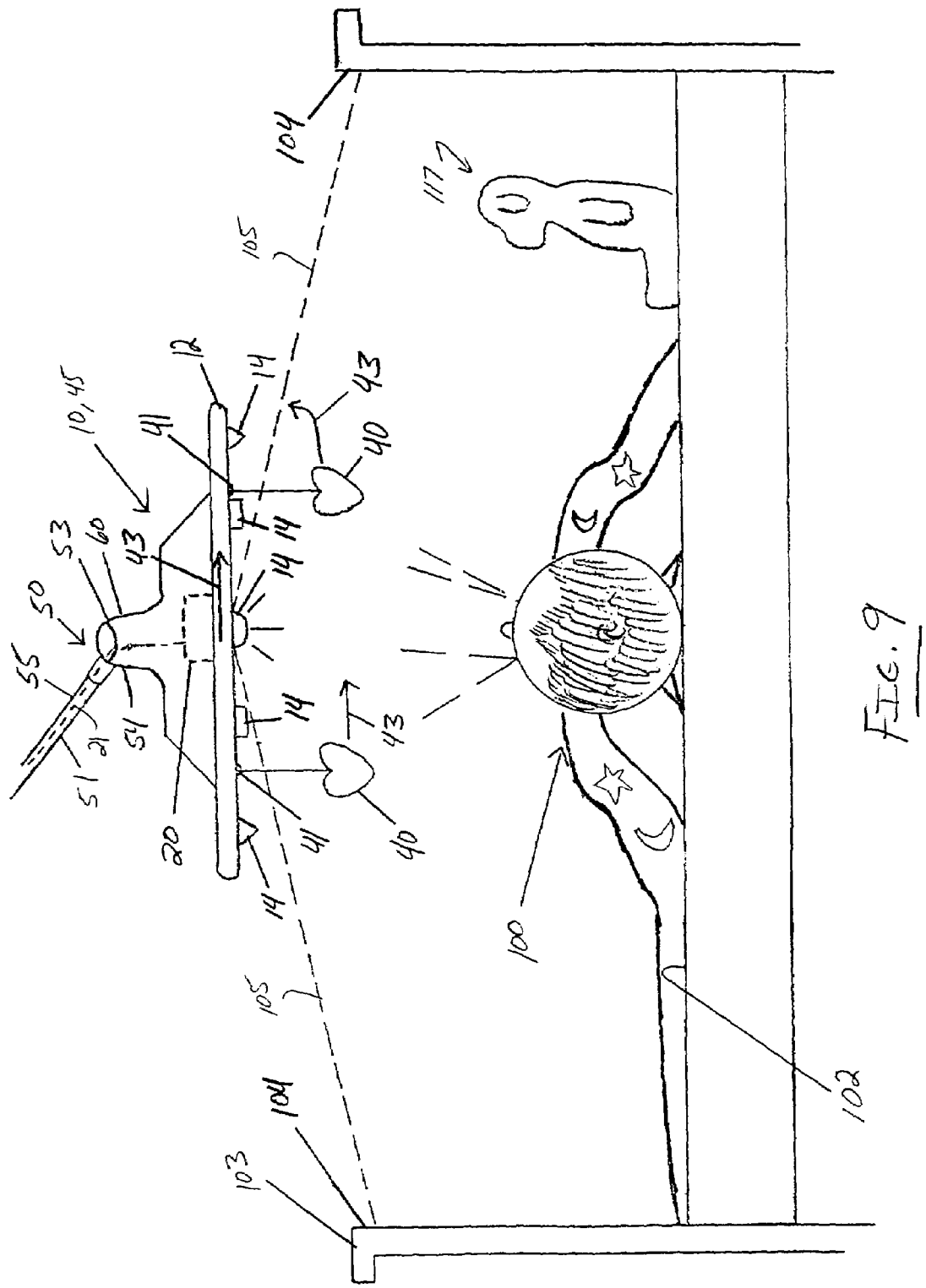
FIG. 9 is a fragmentary end depiction of an extended screen assembly as positioned in superior adjacency to a target subject spatially bound by left structure, right structure, and subject-support structure.

It will be further understood from an inspection of FIGS. 6, 8, and 9, that at least one joint 54 should be structurally positioned intermediate anchor end 52 and display end 53 so as to enable users to more easily and effectively position screen assembly 10 relative to the target subject 100 and/or the select support structure 101 as generally referenced in FIGS. 1, 2, 4, and 5. It will be seen from an inspection of the noted figures that select support structure 101 may be defined by a wall, but it is contemplated that the select support structure 101 may also be defined by a ceiling or other structure capable of fixedly receiving and supporting anchor end 52 (such as the crib rails or crib walls 104). Thus, the select support structure 101 may preferably be selected from the group consisting of a support wall and a support ceiling. As earlier noted, it is contemplated that anchor end 52 may comprise anchoring means (for example, any type of suitable anchoring hardware) for fixedly anchoring anchor end 52 to the select support structure 101.

In this last regard, it should be understood that certain means for positioning screen assembly 10 relative to the target subject 100 are contemplated as being integral to the subject invention. For example, it is further contemplated that in addition to output positioning means 50, the present system may incorporate certain subject-positioning means for positioning the target subject 100 relative to the screen assembly 10 or certain signal-outputting means cooperatively associated therewith. Thus, it is contemplated that the subject-positioning means may preferably be defined by substantially horizontal subject support surface 102 as supported by a bedstead assembly 103, such as a crib, play pen, bed frame, or similar other subject support structure or assembly as generally and generically illustrated and referenced in FIGS. 1, 8, and 9. From an inspection of FIG. 1, it will be seen that the select support structure 101 (the support wall) is preferably spatially located adjacent the support surface 102 so that the output-positioning means 50 may properly position the screen assembly 10 relative to the target subject 101. In other words, the length of extendable arm assembly 51 when in a fully expanded or extended state is (or should be) somewhat limited, and thus the subject-positioning means is preferably located in rather close proximity to the select support structure 101 so as to avoid, for example, accidental collisions between passersby and extendable arm assembly 51. It will be further understood that the anchor end 52 is preferably attachable or anchorable to the select support structure 101 and the display end 53 is preferably attached to the screen assembly 10 or signal-outputting means.

The spatially-bound target subject 100, such as a crib-located infant as generally depicted in FIGS. 8 and 9 may thus be described as spatially-bound by a support assembly. The (infant) support assembly comprises infant-supporting means (such as support surface 102) and support-bounding means, such as the crib rails 104 or (play) pen walls as generally referenced in FIGS. 1, 8, and 9. It is further contemplated, however, that in addition to actual structure such as a wall or rail that may bound a support surface, other boundaries may be effected by a total lack of structure. For example, if the support surface 102 were to be an elevated platform having no walls or rails, but only the edges of the support surface to otherwise bound the subject from freefall, it may be said that the support-bounding means may also be defined thereby. Together, the subject-supporting means (such as a mattress or platform) and the support-bounding means (such as a wall or open space) cooperate to spatially locate or spatially bind the infant or subject for selective surveillance and entertainment via the screen assembly 10.

The notion of spatially locating or binding the target subject 100 is somewhat critical to the present invention as the system is not designed to follow an otherwise mobile target subject beyond certain limitations. In this regard, the reader is directed to FIGS. 8 and 9. There it will be seen that a certain field of surveillance is defined by broken lines 105 (at superior portions of the field of surveillance), the support-bounding means (such as crib rails 104) (at lateral portions of the field of surveillance), and the support surface 102 (at inferior portions of the field of surveillance). Broken lines 105 represent the field of view as generated by a camera lens (not specifically illustrated), which camera lens is discussed in more detail below.

Figure 2:
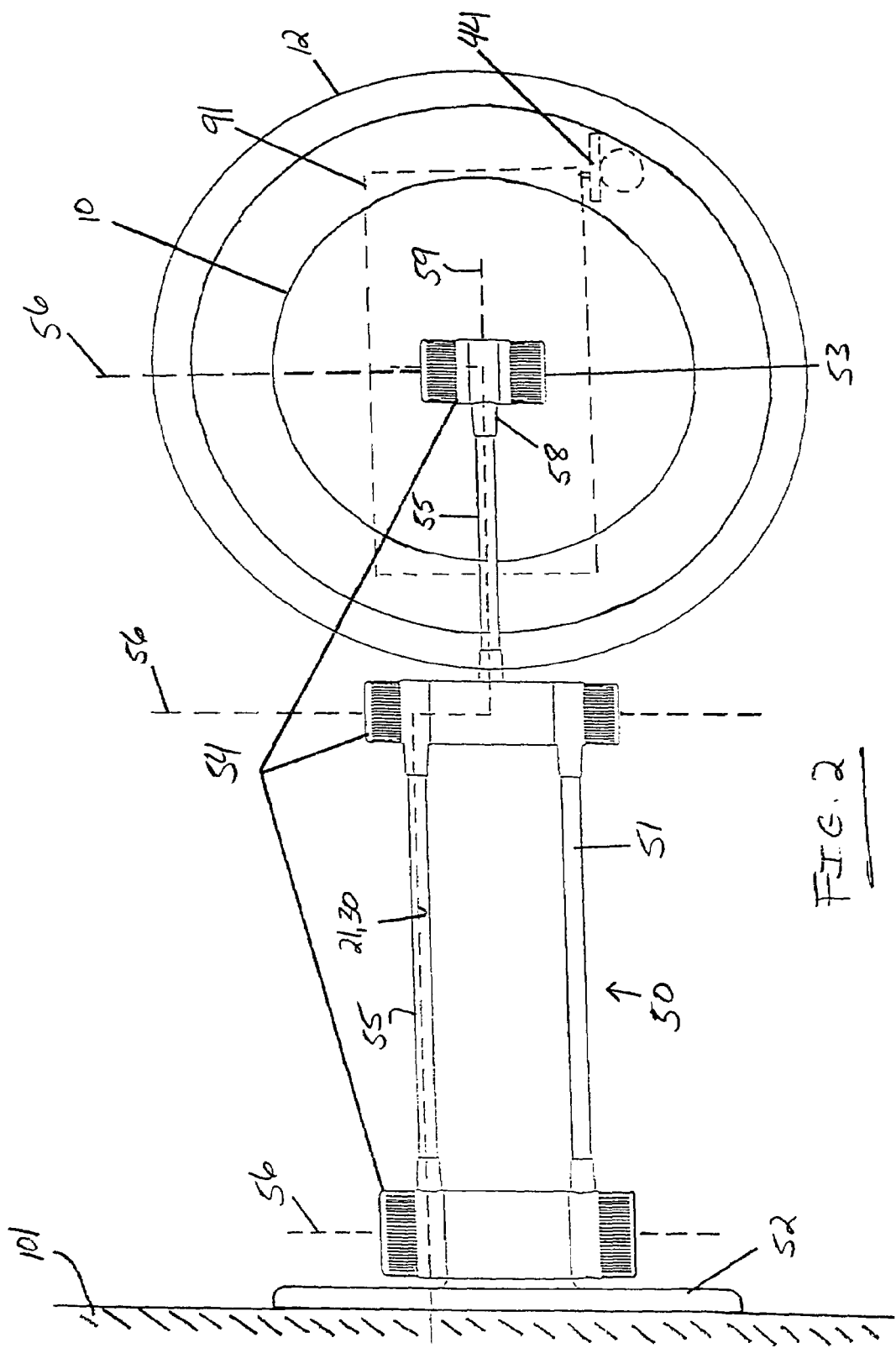
FIG. 2 is a top plan view of a screen assembly as attached to a select support structure via an extendable arm assembly.
Figure 3:
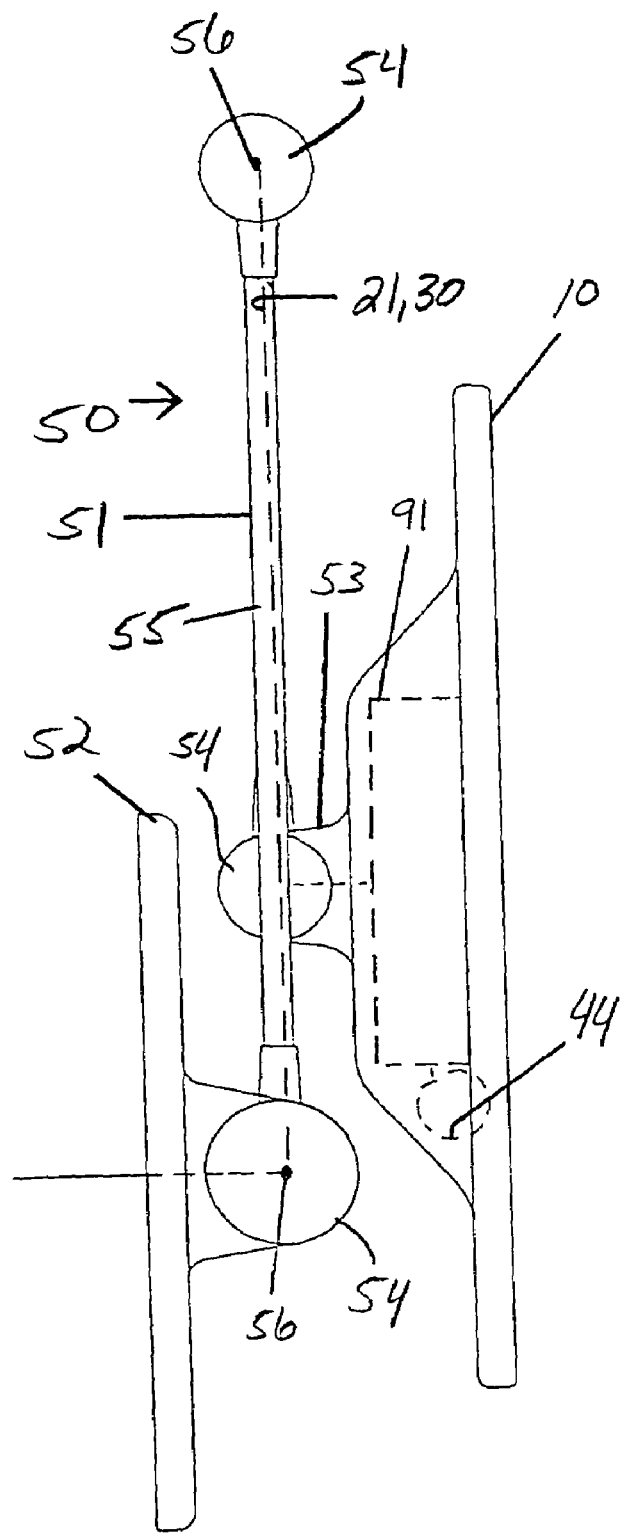
FIG. 3 is a side plan view of the screen assembly as attached to the extendable arm assembly in an unextended state.

It will be seen from an inspection of FIGS. 1-6, 8, and 9 that the joint(s) 54 enable the user or caretaker to position the screen assembly 10 intermediate the select support structure 101 and the target subject 100. In this regard, it is contemplated that extendable arm assembly 51 may comprise three joints 54, each of which may allow the attaching structures (extension arms 55) to pivot about the joint axes 56 as specifically referenced in FIGS. 2-6. Together, extension arms 55 and joints 54 enable the user to extend or displace screen assembly 10 away from the select support structure 101, and further may enable the user to adjust screen assembly 10 relative to the distal most extension arm 55 as generally depicted in FIGS. 4 and 5 at 57. From an inspection of the screen assembly 10 shown in solid lines in FIGS. 4 and 5, it may be understood that the screen assembly 10 is positioned adjacent a support wall (as select support structure) and from an inspection of the screen assembly 10 shown in broken lines (as pivoted about joint axis 56), it may be understood that the screen assembly 10 is positioned in inferior adjacency to a support ceiling.

It will thus be further understood that the joints 54 enable movement about at least one axis of rotation or uniaxial movement. It is further contemplated, however, that joints 54 may further enable biaxial and triaxial movement. From an inspection of FIGS. 2, 4, and 5, for example, it will be seen that certain joint structure may comprise rotation means for rotating the joint 54 about the longitudinal axis extending through the extension arm 55. For example, it is contemplated that a collar 58 may be attached to extension arm 55 so that joint 54 may be made to rotate about extension arm axis 59 as generally depicted and referenced in FIGS. 2-6. Further, from an inspection of FIGS. 8 and 9, it will be seen that the a joint 54 may comprise ball and socket type structure 60 for enabling triaxial movement. It will thus be understood that the extendable arm assembly 51 of the present invention may comprise at least one joint 54, which joint 54 enables select axial movement, the select axial movement being selected from the group consisting of uniaxial movement, biaxial movement and triaxial movement.

Figure 7:
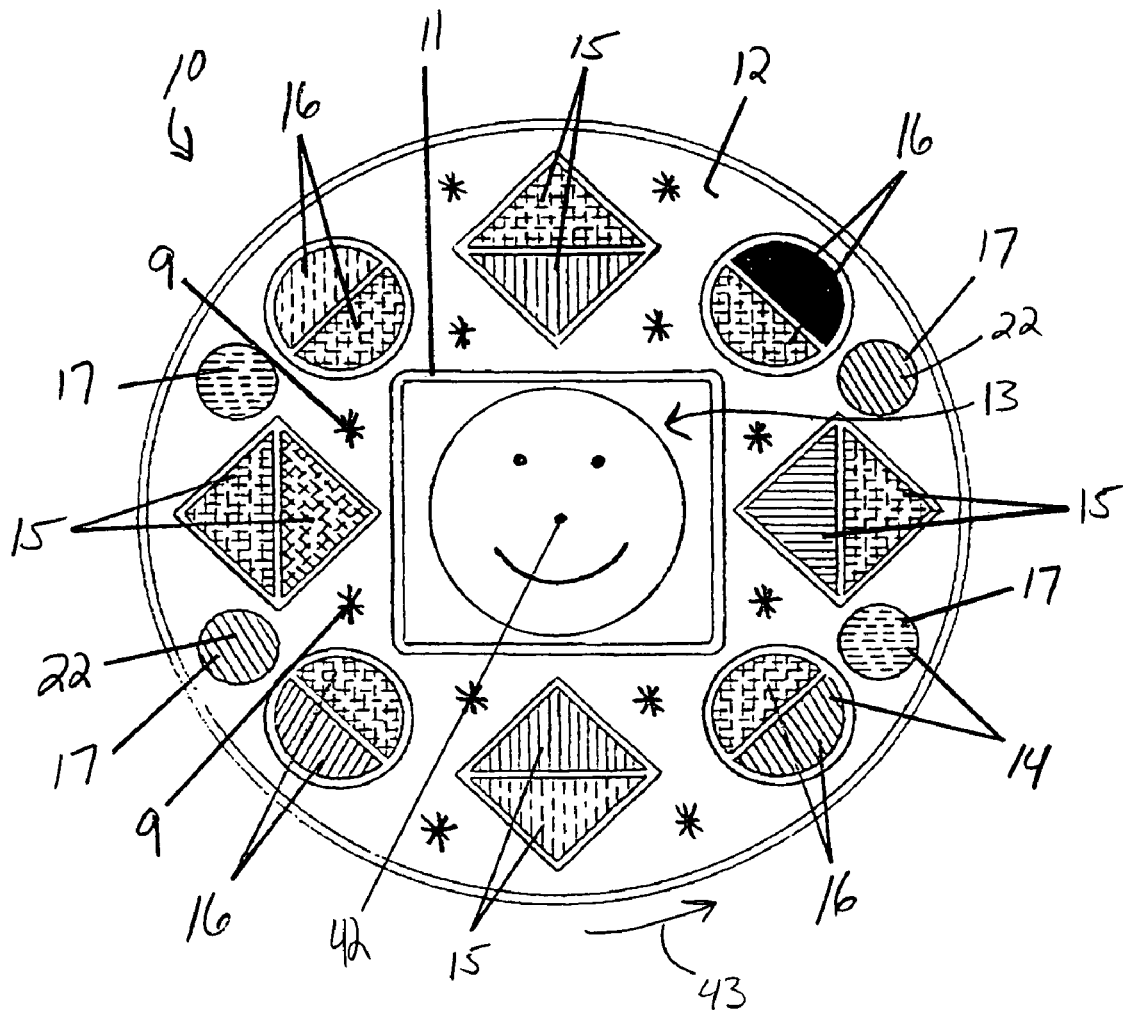
FIG. 7 is a plan view of the viewable surface of the screen assembly showing the view screen with static visual imagery and colorized peripheral visual displays.

The signal-outputting means or screen assembly 10 preferably comprises a visual display surface composed of a centralized view screen 11 as illustrated and referenced in FIGS. 6 and 7; and a peripheral screen border 12 or concentric screen border as illustrated and referenced in FIGS. 2-9. Preferably, the view screen 11 of a liquid crystal display type screen (with necessary screen-operating assemblies) for displaying screen-based visual stimuli. An exemplary, so-called, smiley face 13 is depicted in FIG. 7 for ease of illustration. It is contemplated that view screen 11 may function to display dynamic imagery (such as an animated cartoon) in addition to static imagery (such as an infant-entertaining smiley faces) so as to enhance the entertaining potential of view screen 11.

In this last regard, it is contemplated that certain video displaying equipment and/or certain digital versatile disk (DVD) displaying equipment can be cooperatively associated with view screen for displaying amusing/entertaining and/or educational or developmentally-based video to the target subject 100. For example, it is contemplated that educational DVD's could be displayed on the view screen 11. With lighted color, design the infant or toddler subject might follow and eventually anticipate the next color, thereby learning to follow a pattern sequence. (a very basic mathematical skill and problem solving skill). The child might also learn basic classification skills such as shapes and/or colors matching up together; triangle to triangle, semi-circle to semi-circle' yellow to blue, yellow to red, yellow to black, and one to one classifications. Further, it is contemplated that certain math development skills may be promoted, such as visual representations of two triangles make a square, two semi-circles make a circle and size differential(s)—big circles versus little circles. Thus, it is contemplated that certain electronic machinery capable of delivering electronic signals such as those here introduced may also define the signal-inputting means 70.

The peripheral screen border 12 or concentric screen border preferably comprises a plurality of selectively sized and shaped visual displays 14 as illustrated and referenced in FIGS. 6-9. In this regard, it is contemplated that visual displays 14 are primarily designed for displaying static imagery, such as colors and shapes, as opposed to dynamic imagery. However, it is contemplated that visual displays could be constructed so as to display dynamic content and still fall within the scope of the present invention. Essentially, the visual displays 14 are designed to display a plurality of display-based visual stimuli peripherally adjacent the view screen 11. From an inspection of FIG. 7, in particular, it will be seen that the visual displays comprise eight triangle shapes 15, eight semi-circular shapes 16, four circle shapes 17, and 12 star shapes 9.

Starting at the 12 o'clock position on FIG. 7 and inspecting clockwise, it will be further understood that the "12 o'clock triangles 15 are colored yellow (or gold) and pink (or red) (top and bottom); the 1 o'clock semicircles 16 are black and yellow (or gold) (top and bottom); the 2 o'clock circle 17 is green; the 3 o'clock triangles 15 are blue and yellow (or gold) (left and right); the 4 o'clock circle 17 is gray (or silver); the 5 o'clock semi-circles 16 are yellow (or gold) and green (top and bottom); the 6 o'clock triangles 15 are red (or pink) and yellow (or gold) (top and bottom); the 7 o'clock semi-circles 16 are yellow (or gold) and brown; the 8 o'clock circle 17 is green; the 9 o'clock triangles 15 are yellow (or gold) and orange; the 10 o'clock circle 17 is silver (or gray); and the 11 o'clock semi-circles 16 are purple (or violet) and yellow (or gold). From a comparative inspection of FIG. 7 as compared to FIGS. 8 and 9 it will be seen that visual displays 14 may be either two-dimensional (as in FIG. 7) or three-dimensional (as in FIGS. 8 and 9). Further, it is contemplated that a certain number of star shapes 9 may be included in the design. It is contemplated that these star shapes are preferably small and lighted yellow. Further contemplated is a random light-to-dim sequence that functions separately from the larger shapes. They are meant to catch the infant/child's attention alone or with music during night time and can be used for counting during the day. It is contemplated that 8 star shapes 9 may be spaced evenly between the portion of the bigger shapes around the view screen 11 and 4 star shapes may be spaced evenly on both sides of the top and bottom (12 o'clock and 6 o'clock) triangle. It is well known in the art that shapes and colors are stimulating to infants and other onlookers and thus it is contemplated that simple shapes and colors can be entertaining in addition to the static or dynamic content that may be displayed upon state of the art LCD screens and the like.

A central feature of the present invention is at least one, but possibly a plurality of, energy-passing aperture(s) 18 formed in screen border 12 as illustrated and referenced in FIGS. 6 and 7(*a*). The energy-passing apertures are essentially voids fillable by certain surveillance system components, which components comprise visual display type features. In other words, certain surveillance type structure may comprise visually entertaining stimuli (such as a colored lens filter of a surveillance camera or a colored microphone filter or cover for a surveillance microphone). The visually entertaining stimuli as incorporated into the surveillance components may then be utilized as means for entertaining the target subject 100 (which surveillance means are otherwise unbeknownst to the target subject 100). It may thus be said that the entertaining surveillance components are color-camouflaged to the target subject 100, as will be described in more detail hereinafter.

The surveillance system of the present invention preferably comprises monitorial data-inputting means as preferably defined by a surveillance type camera assembly 20 as generically illustrated in FIGS. 8 and 9. Further, the surveillance system of the present invention comprises certain monitorial data-transmitting circuitry 21 as generally referenced in FIGS. 1-4, 6, 8, 9 and 12; and certain monitorial data-outputting means 80 as generally referenced in FIGS. 1, and 10-12. From an inspection of the noted figures, it will be seen that the (monitorial) data-transmitting circuitry 21 functions to electrically communicate the camera assembly 20 with the (monitorial) data-outputting means 80 as generally referenced in FIGS. 1, and 10-12. It is contemplated that the (monitorial) data-outputting means 80 may be defined by a computer type monitor 81 or video type monitor as generally and generically depicted in FIG. 12; a cellular phone screen display 82 as generally and generically depicted in FIGS. 10 and 11; or similar other visual display means. Video output imagery (as opposed to the thing itself) of the target subject 100 and adjacent subject matter, such as a fanciful stuffed toy 117 are referenced at K (video output imagery of fanciful stuffed toy 117) and T (video output imagery of target subject 100) in FIG. 12. Additionally, it is contemplated that certain video recording equipment and/or certain digital versatile disk (DVD) recording equipment can be cooperatively associated with data-inputting means or camera assembly 20 for recording monitorial input data related to the target subject 100 and any subject matter also spatially-bound in adjacency to the target subject, such as the fanciful stuffed toy 117 (or unwanted hazardous materials) and the like as illustrated and referenced in FIGS. 8 and 9. Thus, it is contemplated that certain electronic machinery capable of delivering electronic signals such as those here introduced may also define the signal-inputting means 70.

Figure 7A:
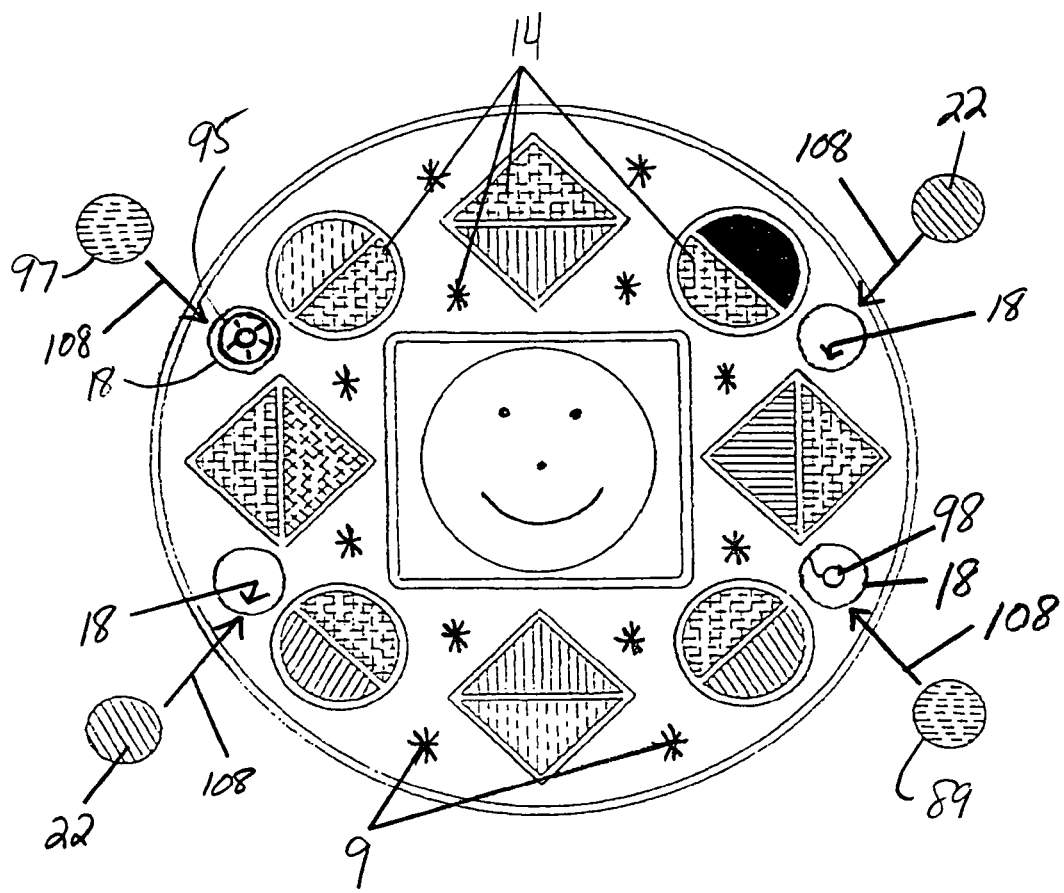
FIG. 7(a) is a plan view of the viewable surface of the screen assembly showing the view screen with static visual imagery and colorized peripheral visual displays with certain colorized visual displays shown exploded from the screen assembly to reveal underlying structure or apertures.

Notably, the camera assembly 20 preferably comprises a camera lens (not specifically shown) and a camera lens light filter 22 as illustrated and referenced in FIGS. 7 and 7(a). The lens light filter(s) 22 have been colored green for illustration purposes only. It will be understood, however, that the lens light filter(s) 22 are designed to be spatially located adjacent certain energy-passing aperture(s) 18 as suitable for the given application, which lens light filter(s) 22 comprise select coloration for forming color-camouflaged, hidden-camera display(s) as previously introduced. The visual displays 14 may thus be said to comprise the color-camouflaged, hidden-camera display(s) when filter(s) are outfitted 108 upon screen assembly 10 as generally depicted in FIG. 7(a). The camera assembly 20 is thus situated in adjacency to a respective lens light filter 22 for receiving and transmitting (visual) data input to the data-outputting means 80 via the energy-passing aperture 18 and the data-transmitting circuitry 21.

It is perhaps important to recall the spatially-bounding characteristics of the present invention. If the application requires more than one camera assembly so as to monitor a larger field of surveillance, additional camera assemblies and hidden-camera displays may be incorporated into the design. FIGS. 7 and 7(a), for example show at least two color-camouflaged, hidden-camera displays. Notably, the data-outputting means 80 and the signal-inputting means 70 are more or less distant from the screen assembly 10, the monitor-entertainment system thus enabling at least one user or caretaker to remotely and selectively monitor and entertain the spatially-bound target subject 100. From an inspection of FIG. 1, it will be seen that it is contemplated that users or caretakers in other rooms (as depicted via broken away floor and wall portions 106) may thus remotely and selectively monitor and entertain the target subject. It will be further seen from an inspection of FIG. 1 that remote control unit 90 is contemplated for directing the entertaining and monitoring processes of the present invention. In this regard, it is further contemplated that the present invention may comprise certain central-processing means 91 as generally and generically referenced in FIGS. 2-4, as perhaps preferably located within or otherwise cooperatively associated with screen assembly 10. It is contemplated that the central processing means 91 may preferably comprise processor-based remote control circuitry (not specifically illustrated) and that the signal-inputting means 70 and the data-outputting means 80 may be incorporated into at least one user-based remote control unit 90, which unit may be defined by a cellular telephone unit 72 as generally and generically depicted in FIGS. 10 and 11.

It will thus be understood that the user-based remote control unit 90 preferably comprising select data-directing means and certain user-based remote control circuitry (not specifically illustrated). Together, the processor-based and user-based remote control circuitry enable remote communication 107 with the central-processing means 91 as generically depicted in FIG. 1. Thus, it is contemplated that the central-processing means 91 may selectively direct the entertainment and surveillance systems and that the select data-directing means may be selected from the group consisting of visual-screening means (such as screen display 82); image-receiving means (such as camera-type data/instruction-inputting means as generally and generically depicted in FIGS. 10 and 11 at 74(c)); audio-amplifying means (such as a speaker assembly 92 as generally and generically referenced in FIG. 10), audio-receiving means (such as a microphone assembly 93 as generally and generically referenced in FIG. 100); and instruction-inputting means (such as a keypad 94 as generally and generically referenced in FIG. 10). It is contemplated that state of the art assemblies of the sort here exemplified may be easily incorporated into the essence of the present invention and thus no further descriptions may be necessary. It is contemplated that the select data-directing means are designed to enhance remote communication 107 with the central processing means 91 for further enabling at least one user or caretaker to remotely and selectively monitor and entertain the target subject 100. In this last regard, for example, it is contemplated that a video-type phone may function to receive voice and/or visual information from a parent, sibling, or other significant other and then deliver the remotely-received information to the screen assembly 10 for entertaining or otherwise communicating with the infant or child.

As perhaps introduced by the foregoing, the monitor-entertainment system of the present invention may additionally comprise certain audio communication features. In this regard, it is contemplated that the entertainment system may comprise certain audio entertainment-outputting means such as a speaker assembly 95 as generally and generically illustrated in FIG. 7(a) and certain audio entertainment-inputting means such as an audio control console 96 as generally and generically illustrated in FIG. 12. It will thus be readily understood that the audio entertainment-inputting means enable the user to output entertaining audio data upon the audio entertainment-outputting means via certain energy-passing aperture(s) (as may be required in the given application) and the signal-delivering circuitry 30. A single speaker assembly 95, for example, is depicted in FIG. 7(a), but any number of speaker assemblies 95 could be incorporated into the design on an "as-needed" basis. The energy-passing aperture(s) associated with the audio data outputting means may thus comprise a (first type) acoustic energy filter 97 (such a speaker screen) as generally and generically referenced in FIGS. 7 and 7(*a*). It will be understood that the first type acoustic energy filter 97 comprises select coloration for forming a color-camouflaged, audio-outputting display. As shown in FIGS. 7 and 7(*a*), a gray (or silver) coloration has been selected, but may comprise any color as elected by the manufacturer or end user. The visual displays 14 may thus be said to comprise the color-camouflaged, audio-outputting display when outfitted 108 with screen assembly as generally depicted in FIG. 7(*a*).

Similarly, the surveillance system of the present invention may comprise monitorial audio-inputting means such as a microphone assembly 98 as generally and generically referenced in FIG. 7(*a*), and monitorial audio-outputting means such as a speaker assembly 99 as generally and generically referenced in FIG. 12. It will be readily understood that the audio-inputting means enable the user to receive audio data upon the audio-outputting means via a select energy-passing aperture 18 and the signal-delivering circuitry 30. The select energy-passing aperture 18 may comprise a select acoustic energy filter 89, the select acoustic energy filter being selected from the group consisting of the first type acoustic energy filter 97 and a second type acoustic energy filter 89 (such as a microphone screen or filter) as generally and generically referenced in FIG. 7(*a*). The select acoustic energy filter comprises select coloration for forming a color-camouflaged, audio-inputting display. It will be seen from an inspection of FIG. 7(*a*) that the second type acoustic energy filter comprises non-limiting gray (or silver) coloration for illustrative purposes. The selectively-sized and shaped visual displays 14 may thus further comprise the color-camouflaged, audio-inputting display.

To enhance the entertaining effect of the present invention, it is contemplated that certain optional features may be incorporated into the basic design. In this regard, it is further contemplated that the monitor-entertainment system may comprise certain hanging elements 40 for selective attachment to the signal-outputting means or screen assembly 10 as illustrated and referenced in FIGS. 5, 8, and 9. In this regard, it is contemplated that peripheral screen border 12 may comprise hanging-element-attaching means (such as ringlets 41) or other similar element-attaching means, which element-attaching means selectively attach the hanging elements 40 to the peripheral screen border 12.

Further, it is contemplated that the monitor-entertainment system may comprise border-displacing means or border-rotating means as may be defined by a gear assembly 44 and certain bearing means for movement cooperatively associated with peripheral screen border 12, which gear assembly 44 is generally and generically referenced in FIGS. 2, 3, and 5. The border-displacing means are designed to dynamically displace a border point along the peripheral screen border 12 relative to anchor end 52, as for example by rotating the peripheral screen border 12. Similarly, the border-rotating means are designed to rotate (as depicted at arrows 43 in FIGS. 7 and 9) the peripheral screen border 12 about an axis of rotation 42, the axis of rotation 42 extending orthogonally through the view screen 11 as generally depicted in FIG. 7. Should hanging elements 40 be attached to peripheral screen border 12, it will be understood that the resulting structure may be thought of as an (infant) entertaining (and monitoring) mobile apparatus as depicted at 45 in FIGS. 8 and 9.

While the above description contains much specificity, this specificity should not be construed as limitations on the scope of the invention, but rather as an exemplification of the invention. For example, as is believed inherently incorporated by the foregoing descriptions that the present disclosure may further be said to disclose a monitor-entertainment system for enabling at least one user to remotely and selectively monitor and entertain a subject, the monitor-entertainment system comprising an entertainment system and a surveillance system. The entertainment system comprises signal-outputting means, signal-delivering circuitry, signal-inputting means, and output-positioning means. The output positioning means selectively position the signal-outputting means intermediate the signal-inputting means and a subject. The signal-delivering circuitry electrically communicates the signal-outputting means with the signal-inputting means, which signal-inputting means enabling at least one user to selectively output entertaining stimuli upon the signal-outputting means via the signal-delivering circuitry. The signal-outputting means output the stimuli to the subject and comprise at least one energy-passing aperture. The signal-outputting means may be defined by a visual display surface (e.g. the view screen and peripheral screen border).

The surveillance system comprises data-inputting means, data-transmitting circuitry, and data-outputting means. The data-transmitting circuitry electrically communicates the data-inputting means with the data-outputting means. The data-inputting means are color-camouflaged adjacent a first energy-passing aperture for receiving and transmitting monitorial data input to the data-outputting means via the first energy-passing aperture and the data-transmitting circuitry and for providing color-camouflaged display to the subject. The data-outputting means and the signal-inputting means may be distant or spatially separated from the signal-outputting means. The monitor-entertainment system thus enables at least one user to remotely and selectively monitor and entertain the subject. The data-inputting means may be defined by a camera assembly, which assembly comprises a lens light filter having select coloration and being spatially located adjacent a select energy-passing aperture. The lens light filter thus forms a color-camouflaged, hidden-camera display. The visual display surface displays certain visual stimuli, which stimuli comprise the color-camouflaged, hidden-camera display.

Thus, although the invention has been described by reference to a preferred embodiment, it is not intended that the novel kit be limited thereby, but that modifications thereof are intended to be included as falling within the broad scope and spirit of the foregoing disclosure, the following claims and the appended drawings.

I claim:

1. A monitor-entertainment system for enabling at least one user to selectively monitor and entertain a subject, the monitor-entertainment system comprising, in combination:

an entertainment system, the entertainment system comprising a substantially planar screen assembly, signal-delivering circuitry, signal-inputting means, and output-positioning means, the screen assembly comprising a centralized view screen and a peripheral screen border, the output positioning means for selectively positioning the screen assembly intermediate the signal-inputting means and a target subject, the signal-delivering circuitry electrically communicating the screen assembly with the signal-inputting means, the signal-inputting means for enabling at least one user to selectively output entertaining stimuli upon the screen assembly via the signal-delivering circuitry, the view screen for displaying screen-based visual stimuli, the peripheral screen border comprising a plurality of colored geometric shapes and at least one energy-passing, geometrically-shaped aperture, and a surveillance system, the surveillance system comprising a camera assembly, data-transmitting circuitry, and data-outputting means, the data-transmitting circuitry electrically communicating the camera assembly with the data-outputting means, the camera assembly comprising a lens light filter, the lens light filter being spatially located adjacent the energy-passing, geometrically-shaped aperture, the lens light filter comprising select coloration, the lens light filter thus forming a color-camouflaged, hidden-camera display, the colored shapes comprising the color-camouflaged, hidden-camera display, the monitor-entertainment system thus enabling at least one user to selectively monitor and entertain the subject.

2. The monitor-entertainment system of claim 1 wherein the entertainment system comprises audio entertainment-outputting means and audio entertainment-inputting means, the audio entertainment-inputting means enabling the user to output entertaining audio upon the audio entertainment-outputting means via a second energy-passing, geometrically-shaped aperture and the signal-delivering circuitry, the second energy-passing, geometrically-shaped aperture comprising a first acoustic energy filter, the first acoustic energy filter comprising select coloration, the first acoustic energy filter thus forming a color-camouflaged, audio-outputting display, the colored geometric shapes comprising the color-camouflaged, audio-outputting display.

3. The monitor-entertainment system of claim 1 wherein the output-positioning means are defined by an extendable arm assembly, the extendable arm assembly comprising an anchor end, a display end, and at least one joint intermediate the anchor end and the display end, the anchor end being attachable to select support structure and the display end being attached to the screen assembly, the joint enabling the user to position the screen assembly intermediate the select support structure and the subject.

4. The monitor-entertainment system of claim 3 comprising subject-positioning means, the subject positioning means for positioning the subject relative to the screen assembly.

5. The monitor-entertainment system of claim 4 wherein the subject-positioning means comprise a subject support surface, the subject support surface being spatially located adjacent the select support structure.

6. The monitor-entertainment system of claim 3 wherein at least one joint enables select axial movement, the select axial movement being selected from the group consisting of uniaxial movement, biaxial movement, and triaxial movement.

7. The monitor-entertainment system of claim 1 comprising central-processing means and processor-based remote control circuitry, the signal-inputting means and the data-outputting means being bound by at least one user-based remote control unit, the user-based remote control unit comprising select data-directing means and user-based remote control circuitry, the processor-based and user-based remote control circuitry for enabling remote communication with the central-processing means, the central-processing means for selectively directing the entertainment and surveillance systems, the select data-directing means being selected from the group consisting of visual-screening means, image-receiving means, audio-amplifying means, audio-receiving-means, and instruction-inputting means, the select data-directing means for enhancing remote communication with the central-processing means.

8. The monitor-entertainment system of claim 1 comprising border-displacing means and the screen border comprises an axis of rotation, the border-displacing means for rotating the screen border about the axis of rotation relative to the view screen.

9. The monitor-entertainment system of claim 8 comprising hanging elements, the hanging elements being selectively attachable to the screen border, the rotatable screen border and the hanging elements for forming a mobile apparatus characterized by the centralized view screen.

\* \* \* \* \*